United States Patent [19]
Schmidt-Brücken et al.

[11] Patent Number: 5,322,150
[45] Date of Patent: Jun. 21, 1994

[54] ARRANGEMENT FOR CONTROLLING THE SLIP OF AN AUTOMATIC FRICTION CLUTCH

[75] Inventors: Hans-Joachim Schmidt-Brücken, Geldersheim; Thomas Kuhn, Bad Kissingen, both of Fed. Rep. of Germany

[73] Assignee: Fichtel & Sachs AG, Schweinfurt, Fed. Rep. of Germany

[21] Appl. No.: 814,752

[22] Filed: Dec. 30, 1991

[30] Foreign Application Priority Data

Jan. 9, 1991 [DE] Fed. Rep. of Germany ....... 4100372

[51] Int. Cl.⁵ ............................................. F16D 43/22
[52] U.S. Cl. ................................... 477/176; 364/424.1; 477/175
[58] Field of Search ............... 192/0.076, 0.032, 0.075, 192/0.096; 364/424.1

[56] References Cited

U.S. PATENT DOCUMENTS

| | | | |
|---|---|---|---|
| 4,660,697 | 4/1987 | Yoneda et al. | 192/0.076 X |
| 4,793,454 | 12/1988 | Petzold et al. | 192/0.032 |
| 4,854,433 | 8/1989 | Tellert | 192/0.033 |
| 4,858,131 | 8/1989 | Sugimura et al. | 192/0.076 X |
| 4,905,801 | 3/1990 | Tezuka | 192/0.076 X |
| 4,971,183 | 11/1990 | Tellert | 192/0.033 |
| 5,065,849 | 11/1991 | Kono et al. | 192/0.076 |
| 5,082,096 | 1/1992 | Yamashita et al. | 364/424.1 X |
| 5,105,926 | 4/1992 | Yoshimura et al. | 192/0.032 |
| 5,121,820 | 6/1992 | Brown et al. | 364/424.1 X |
| 5,123,302 | 6/1992 | Brown et al. | 192/0.032 X |
| 5,128,868 | 7/1992 | Imai et al. | 364/424.1 |
| 5,160,003 | 11/1992 | Suzuki | 192/0.076 X |
| 5,190,130 | 3/1993 | Thomas et al. | 192/0.032 |

FOREIGN PATENT DOCUMENTS

3116455 11/1982 Fed. Rep. of Germany.
3438594 4/1986 Fed. Rep. of Germany.
3606229 9/1986 Fed. Rep. of Germany ... 192/0.076

*Primary Examiner*—Rodney H. Bonck
*Assistant Examiner*—Andrea Pitts
*Attorney, Agent, or Firm*—Anderson Kill Olick & Oshinsky

[57] ABSTRACT

A slip control loop (13) is proposed which compares the actual differential speed between input and output speed of a friction clutch (5) of a motor vehicle with a desired differential value and adjusts a positioning drive (7) of the clutch (5) according to the desired differential speed. To increase the accuracy of control, a desired position signal from a clutch characteristic curve memory (25) is additively superimposed in the sense of an influencing variable on the desired position signal s' calculated by a controller (19) of the slip control loop (13). The clutch characteristic curve memory (25) stores the desired position signal s" as a function of the clutch moment which can be transmitted in this position and is addressed according to the instantaneous engine moment determined, for example, via an engine characteristic map (27). During a load change of the engine (1), the clutch (5) is adjusted to the expected moment before a significant change in the actual differential speed occurs. The controller (19) has an integrating controller property so that the integral portion of the desired signal s' is zero when the dimensioning of the clutch characteristic curve stored in the clutch characteristic curve memory (25) is corrected. A correcting device (33) allows step-wise correction of the characteristic curve as a function of the value of the integral portion.

14 Claims, 1 Drawing Sheet

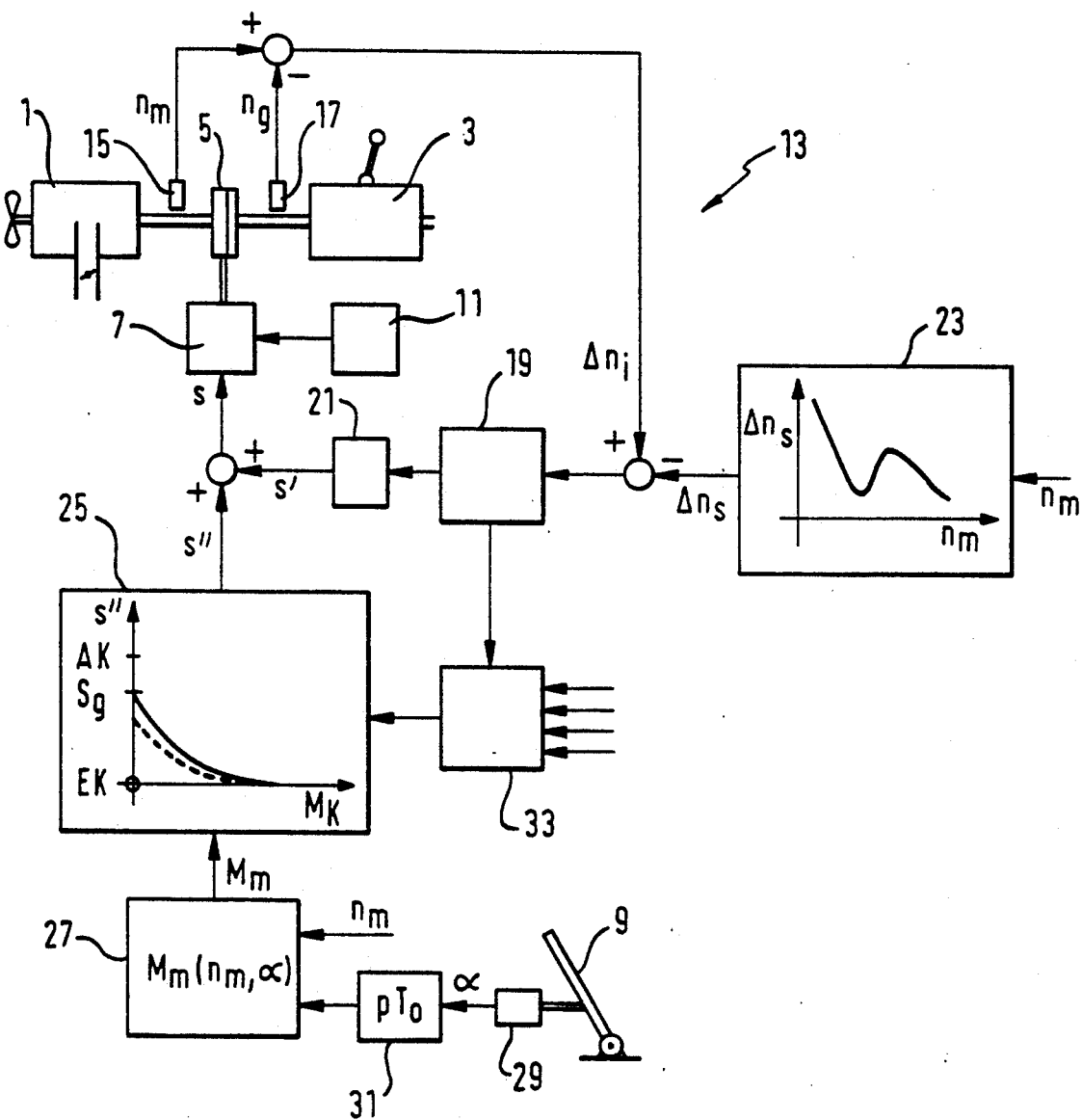

ARRANGEMENT FOR CONTROLLING THE SLIP OF AN AUTOMATIC FRICTION CLUTCH

BACKGROUND OF THE INVENTION

The invention relates to an arrangement for controlling the slip of an automatic friction clutch arranged between the engine and the gearbox of a motor vehicle. From another aspect, the invention relates to an arrangement for correcting data stored in a data memory for the control of such a friction clutch.

It is known to engage and disengage conventional friction clutches arranged between the engine and the gearbox of a motor vehicle by means of a positioning drive which adjusts the clutch as a function of a comparison between a desired value and an actual value to a position which can be predetermined by a desired position signal. The desired position signal is produced for the automatic operation of the clutch by control means according to the travel situation of the motor vehicle. The control means can adapt its engagement characteristic in a known manner to the differing requirements during the start up of the motor vehicle or during a change of gear speeds.

It is known from DE-A-34 38 594 to keep the slip of the clutch at a predetermined desired slip value by means of a slip controlling circuit, independent of the control means controlling engagement and disengagement of the clutch. The slip controlling circuit can be used, on the one hand, to reduce rotary vibrations in the power train of the motor vehicle in that, for example, as a function of the engine speed a slip which is slight in comparison with this speed is permitted. On the other hand, the slip controlling circuit can be made effective in the final phase of the engagement process in order to achieve particularly soft and smooth engagement.

With the known slip controlling circuit, the input speed and the output speed of the clutch are measured by means of speed sensors and an averaging circuit produces an average value signal corresponding to the timed average value of the difference between these speeds, which the slip controlling circuit compares with a signal representing the instantaneous difference. The slip controlling circuit produces the desired position signal adjusting the positioning drive as a function of this comparison. The accuracy of control of the known slip controlling circuit is frequently inadequate in practice if small speed differences between input speed and output speed of the clutch of, for example, 1 to 2% of the input speed are to be regulated. In particular, great variations in the differential speed can occur with the known slip controlling circuit during a change in the power requirement of the engine, for example owing to a change in the position of the accelerator pedal. The known slip controlling circuit can follow only to a limited extent and comparatively slowly during a change of load.

SUMMARY OF THE INVENTION

The invention provides an arrangement for controlling the slip of an automatic friction clutch by means of which a predeterminable slip can be maintained with a high quality of control both during stationary running and during a change of load.

The invention is based on a slip controlling arrangement comprising a positioning drive, which adjusts the clutch as a function of a desired position signal to a position defined by the desired position signal, and speed sensors which detect the clutch input speed and the clutch output speed. A slip controlling arrangement (device) produces the desired position signal as a function of the instantaneous difference between clutch input speed and clutch output speed such that the instantaneous speed difference is equal to a predetermined desired speed difference. To achieve a high quality of control of the slip controlling device, this device is provided with a clutch characteristic curve memory which stores the desired position signal in the form of a characteristic curve as a function of data representing the torque transmitted by the clutch in the desired position. The clutch characteristic curve memory produces the desired position signal according to the value of the instantaneous engine torque determined by a torque determining device, the slip controlling device superimposing the desired position value of the clutch characteristic curve memory on a control signal component produced by its controller.

With a slip controlling device of this type, the desired position signal is superimposed on the control signal content in the form of an influencing variable which sets the clutch into a position in which the torque transmitted by the clutch is substantially equal to the torque produced by the engine. The engine torque is measured or is calculated from stored characteristic map data or control data from the engine and defines the position of the clutch release means allocated to this torque in the clutch characteristic curve memory. Changes of engine load, for example owing to a change of the accelerator pedal position therefore allow pre-adjustment of the clutch position so that the slip controlling device finds almost stationary conditions when the characteristic curve memory is correctly adjusted and the engine torque is correctly determined. The correcting intervention takes place directly, and it is not necessary to await control deviations at the output of the controlling section. Overall, therefore, very high accuracy of control can be achieved.

A controller having integrating properties is preferably used. This allows asymptotic approximation of the actual slip value to the desired slip value and prevents finite stationary control deviations. A proportional integral differential controller has proven particularly desirable. Instabilities of control can be prevented in a particularly great clutch moment range by means of such a controller. This is due predominantly to the differential content of the controller.

With very high parameters of the controlling characteristic, in particular high proportional portion, which are desired for a high quality of control, vibrations may occur in the power train of the motor vehicle, mainly in low gear speeds. These vibrations of about 10 Hz excited with the first inherent frequency of the power train are manifested as "grabbing" of the clutch. To prevent this, the control signal component of the controller is preferably guided via a filter which eliminates frequencies with the first inherent frequency of the power train. In the simplest case, the filter can be produced by averaging means. The parameters of the controller and of the filter are preferably varied as a function of the gear speeds adjusted instantaneously at the gearbox.

In an expedient embodiment of the invention, the torque determining device comprises an engine characteristic curve memory, which delivers the data representing the torque as a function of the speed sensor detecting the engine speed, and a position sensor detecting the position of a power setting element of the engine, in particular an accelerator pedal. With such an embodiment, the build-up of the torque actually produced by the engine can be delayed momentarily relative to the adjustment of the clutch to the moment predetermined by the adjustment of the power setting element so that the clutch is fed in, for example before the engine moment has actually assumed its new value. This leads to an undesirable momentary drop in the differential speed. To avoid this effect, a time delay element can be provided at the input or at the output of the engine characteristic curve memory.

In the context of the above described aspect of the invention, the clutch is positioned in the sense of influencing variable compensation as a function of the actual instantaneous engine torque in addition to slip control, more specifically such that the clutch moment is equal to the engine moment. This mode of operation assumes that the data stored in the clutch characteristic curve memory correctly reproduce the torque desired position characteristic of the clutch. This characteristic can change as a function of the heating and wear of the clutch during travel, more specifically with respect to the contact point of the clutch, i.e. the limit position of incipient torque transmission of the clutch, and with respect to the trend of the characteristic curve which can change as a function of the coefficients of friction of the clutch over its service life.

It is known from DE-A-31 16 455, in the case of an automatic friction clutch of a motor vehicle, to compensate influences of the above-mentioned type in that the desired position signal for the contact point is stored in a reference memory and is updated from time to time by a correcting device. For correction purposes, the driving power of the positioning drive of the clutch is reduced until the positioning drive is no longer capable of completely disengaging the clutch. The positioning drive therefore remains in a position defined by the instantaneous state of wear of the clutch, the stationary position being a measure of the current contact point. However, correction is dependent on a specific mode of operation with the known arrangement and is generally carried out when the motor vehicle is put into operation. Continuous checking of the data of a clutch characteristic curve memory is not possible. The accuracy of the known arrangement is also inadequate for many applications.

A second aspect of the invention which is also significant independently of the above described slip controlling arrangement, for correcting data in a clutch characteristic curve memory of an automatic clutch, allows comparatively accurate correction of stored clutch positioning data even during travel.

According to the second aspect of the invention, speed sensors are also provided which detect the input speed and the output speed of the clutch, and a slip controlling device is provided which keeps the instantaneous differential speed between detected input speed and detected output speed of the clutch at a predetermined desired slip value for correcting the stored data. The slip controlling device has a controller with an integrating controller characteristic content which superimposes a control signal component on the desired position signal of the data memory. A correcting device corrects the desired position signal stored in the data memory so that the integral portion of the control signal component superimposed on the desired position signal is at least approximately zero. The second aspect of the invention is based on the consideration that, with correct data in the data memory, the stationary clutch position is predetermined correctly by the desired position signal stored in the memory. The integral portion at the output of the controller therefore has to be equal to zero. If the integral portion differs from zero, this can be utilised for, for example stepwise, correction of the stored desired position signal, for example in such a form that a fraction of the integral portion at the output of the controller is added to the desired position signal, more specifically until the integral portion becomes zero owing to the correction.

In the manner described hereinbefore it is possible to correct not only individual desired position signals, in particular for the contact point, but also regions of characteristic curves stored in a clutch characteristic curve memory. Correction can take place position by position in succession for the individual data; however, the entire characteristic curve can also be orientated according to a predetermined corrected position, in particular the limit position of incipient torque transmission. With a characteristic curve memory which is addressable as a function of the determined engine moment, the individual engine moments can be adjusted in succession during operation so that the correcting device can enter the characteristic curve into the characteristic memory in succession in the manner of a learning operation.

The various features of novelty which characterize the invention are pointed out with particularity in the claims annexed to, and forming part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing shows a block circuit diagram of a slip controlling arrangement for an automatic friction clutch of a motor vehicle and an arrangement for correcting data in a clutch characteristic curve memory.

DESCRIPTION OF PREFERRED EMBODIMENTS

In the driving path between an engine 1 and a change-speed gear 3 of a motor vehicle there is arranged a friction clutch 5 which can be positioned by a positioning drive 7, in particular an electric motor-driven positioning drive 7, between a completely engaged position EK and a completely disengaged position AK as a function of a desired position signal s. The positioning drive 7 comprises a position control loop which is not shown in detail, which detects the position of a release means of the clutch 5 and sets to the position defined by the desired position signal s by means of desired value-actual value comparison. The power of the engine 1 can be varied in the conventional manner, not illustrated in detail, via an accelerator pedal 9. A clutch controller 11 controls the engagement and disengagement as a function of the instantaneous travel situation, the engagement characteristic being program-controlled in predetermined but different manners during the start-up of the motor vehicle and during a speed change of the gearbox 3.

Rotary vibrations can be excited in the power train of the motor vehicle during operation. To reduce the rotary vibrations, the clutch can be adjusted to slip of predetermined value. A slip control loop generally designated by 13 is provided for this purpose. The slip control loop detects the engine speed $n_m$, i.e. the input speed of the clutch 5, with a speed sensor 15, the input speed $n_g$ of the gearbox 3, i.e. the output speed of the clutch 5, with a speed sensor 17 and forms an actual speed signal $\Delta n_i$ which represents the actual slip and compares it with the predetermined desired slip $\Delta n_s$. As a function of the comparison between the actual slip value and the desired slip value, a controller 19, which is a PID controller, that is a controller with proportional integral differential properties, calculates a desired position signal s' which is supplied via a filter 21 at the output of the controller 19 to the positioning drive 7. The slip control loop 13 therefore maintains a differential speed of the clutch 5 established by the desired slip $\Delta n_s$ independently of the controller 11 of the clutch.

The desired slip $\Delta n_s$ is read out from a slip characteristic curve memory 23 as a function of the engine speed $n_m$. The slip characteristic curve memory 23 contains a slip characteristic curve determined empirically according to the vibration behaviour of the power train which is dependent on the engine speed.

The characteristic curve is selected such that the slip increases with the vibration amplitude but is kept as small as possible to reduce the load of the clutch 5. It goes without saying that the characteristic curve can determine the desired slip $\Delta n_s$ also as a function of the input speed of the gearbox 3. The slip characteristic curve memory 23 can also contain characteristic curves which are dependent on other parameters, for example time-dependent characteristic curves which define a transfer slip for particularly soft and smooth engagement at the end of a speed-change process.

The slip control loop 13 must be capable of correcting differential speeds of the order of some few revolutions per minute, for example ±10 revolutions per minute in a very large engine speed range of some 1,000 revolutions per minute. This imposes particularly high requirements on the accuracy of control of the slip control loop 13, particularly when correcting speed variations resulting from a change of load due to a change of the position of the accelerator pedal 9. Speed variations of this type can have very high values. To enable very high accuracy of control still to be maintained, the slip control loop 13 is allocated a clutch characteristic curve memory 25 which stores a characteristic curve of the clutch characteristic. The clutch characteristic curve memory 25 contains desired position signals s" as a function of the clutch moment $M_K$ transferred by the clutch 5 in the position defined by the desired position signal s". The clutch characteristic curve memory 25 is addressed by the value of the engine moment $M_m$ which is read from an engine characteristic map memory 27 corresponding to the characteristic map of the engine 1 and as a function of its engine speed $n_m$ as well as the instantaneous position of the accelerator pedal 9 detected by a position sensor 29. The desired position signal s" obtained in this way therefore corresponds to the position of the clutch 5 in which the very moment $M_m$ delivered by the engine 1 is transmitted. The desired position signal s" is superimposed on the desired position signal s' additively in the sense of influencing variable compensation and, together with the desired position signal s' defines the position to which the positioning drive 7 adjusts the clutch 5. In the clutch position defined by the desired position signal s", the moment transmitted by the clutch 5 is equal to the instantaneous torque of the engine 1. During a change of load resulting from a change of the accelerator pedal position, the clutch 5 is adjusted to the torque expected in the changed position of the accelerator pedal before the engine speed and therefore the actual slip can change. In order to compensate dynamic effects which can arise, for example, due to the fact that the positioning drive 7 adjusts the clutch 5 more rapidly to the expected torque value than the engine torque can actually build up, a lag element 31 is connected between the sensor 29 and the engine characteristic map memory 27.

The accuracy with which the clutch 5 can be adjusted to the engine torque expected during a change of the accelerator pedal position is dependent on whether the characteristic curve of the clutch characteristic curve memory 25 correctly reproduces the clutch characteristic. As the clutch characteristic can change not only as a function of wear over a prolonged period of time but also as a function of temperature during operation, a correcting device 33 is provided to allow continuous correction of the characteristic curve even during travel. The correcting device 33 makes use of the fact that, during stationary operation, i.e. when the desired slip $n_s$ is predetermined constantly, the integral content of the controller 19 assumes the value zero when the desired position signal s" is able to adjust the clutch 5 correctly to the engine torque corresponding to the accelerator pedal position and the engine speed. For correcting the characteristic curve of the clutch characteristic curve memory 25, the correcting device 33 changes the value of the desired position signal s" stepwise by a small fraction of the integral portion in the desired position signal s', until the integral portion is zero. The correction can take place for different torque values of the characteristic curve so that regions of the characteristic curve can also be corrected. However, it is also possible to correct only the desired position signal $s_g$ in the position of incipient torque transmission of the clutch, wherein the characteristic curve can be adapted overall by parallel displacement and/or a change of its inclination. A characteristic curve which has been corrected in the foregoing manner is shown in broken lines in the diagram of the clutch characteristic curve memory 25. For recognition of the need for correction, the correcting device 33 can respond to the desired position signal s, the actual position signal representing the actual position of the clutch and to the actual value and the desired value of the slip.

It should be added that the filter 21 is adapted to the first inherent vibration of the power train in order to eliminate from the desired position signal s' control vibrations which can be excited by vibrations in the power train, in particular in the low speeds of the gearbox 3. The parameters of the filter 21 and also of the controller 19 can be variable as a function of the speed position of the gearbox 3.

While specific embodiments of the invention have been shown and described in detail to illustrate the application of the inventive principles, it will be understood that the invention may be embodied otherwise without departing from such principles.

What we claim is:

1. An arrangement for controlling a slip of an automatic friction clutch (5) arranged between an engine (1) and gearbox (3) of a motor vehicle, comprising a positioning drive (7) adjusting the clutch (5) as a function of a desired position signal to a position defined by the desired position signal, a speed sensor (15) detecting a clutch input speed, a speed sensor (17) detecting a clutch output speed, slip controlling means (13) which produce the desired position signal as a function of an instantaneous difference between the clutch input speed and the clutch output speed detected by the speed sensors (15, 17) such that an instantaneous speed difference is equal to a predetermined desired speed difference, wherein said slip controlling means (13) is allocated a clutch characteristic curve memory (25) which stores the desired position signal in the form of a characteristic curve as a function of data representing a torque transmitted by the engine in the desired position, wherein the clutch characteristic curve memory (25) produces the desired position signal corresponding to a value of an instantaneous torque of the engine (1) determined by torque determining means (27, 29) and wherein said slip controlling means (13) superimposes the desired position signal of the clutch characteristic curve memory (25) on a control signal component produced by a controller (19).

2. An arrangement according to claim 1, wherein a control characteristic of the controller (19) has an integral content.

3. An arrangement according to claim 2, wherein the controller (19) is a proportional plus integral plus differential controller PID controller.

4. An arrangement according to claim 1,
wherein the control signal component of the controller (19) is filtered by a filter (21) which eliminates frequencies with a first inherent frequency of a power train.

5. An arrangement according to claim 1,
wherein said torque determining means (27, 29) comprises an engine characteristic curve memory (27) which delivers data representing torque in response to the speed sensor (15) detecting engine speed and to a position sensor (29) detecting a position of a power setting element of the engine (1).

6. An arrangement according to claim 1,
wherein a time delay element (31) is provided at an input of an engine characteristic map memory (27).

7. An arrangement according to claim 1,
wherein data for the desired speed difference predetermined by the slip controlling means (13) are stored in a slip characteristic curve memory (23) as a function of an engine speed.

8. An arrangement for correcting data which is stored in a data memory control, comprising:
an automatic friction clutch (5) arranged between an engine (1) and gearbox (3) of a motor vehicle and representing at least one desired position of a release means of the clutch (5), including data which represents a limit position of incipient torque transmission, the clutch (5) being adjustable as a function of a desired position signal by means of a positioning control drive (5) to a release positioned defined by the desired position signal, comprising speed sensors for detecting an input speed and an output speed of the clutch (5), a slip controlling means (13) for keeping an instantaneous differential speed between detected input speed and detected output speed of the clutch (5) at a predetermined desired slip value for correction of the stored data, said slip controlling means (13) comprising a controller (19) having integrating control characteristic properties and superimposing a control signal component on the desired position signal of the data memory (25) and correcting means (33) correcting the desired position signal in the data memory (25) such that an integral portion of a control signal component superimposed on the desired position signal is at least approximately zero.

9. An arrangement according to claim 8, wherein the data memory is designed as a clutch characteristic curve memory (25) and stores a desired position signal in the form of a characteristic curve as a function of data representing a torque transmitted by the clutch (5) and wherein said correcting means (33) corrects regions of the characteristic curve.

10. An arrangement according to claim 9, wherein said
correcting means (33) corrects a limit position and adjusts the characteristic curve relative to the corrected limit position.

11. An arrangement according to claim 9, wherein
the characteristic curve memory (25) produces a desired position signal corresponding to a value of an instantaneous torque of the engine (1) determined by torque determining means (27, 29) and said correcting means (33) are operable in a learning mode in which the characteristic curve is written into the characteristic curve memory (25).

12. An arrangement according to claim 1, wherein a time delay element (3) is provided at an output of an engine characteristic map memory (27).

13. An arrangement according to claim 1, wherein data for the desired speed difference predetermined by the slip controlling means (13) are stored in a slip characteristic curve memory (23) as a function of an input speed of the gearbox (3).

14. An arrangement according to claim 1, wherein said torque determining means (27, 29) comprises an engine characteristic curve memory (27) which delivers data representing torque in response to the speed sensor (15) detecting engine speed and to a position sensor (29) detecting position of an accelerator pedal (9).

* * * * *